Sept. 12, 1967 E. M. FLANIGEN ET AL 3,341,302
FLUX-MELT METHOD FOR GROWING SINGLE CRYSTALS
HAVING THE STRUCTURE OF BERYL
Filed Oct. 6, 1964
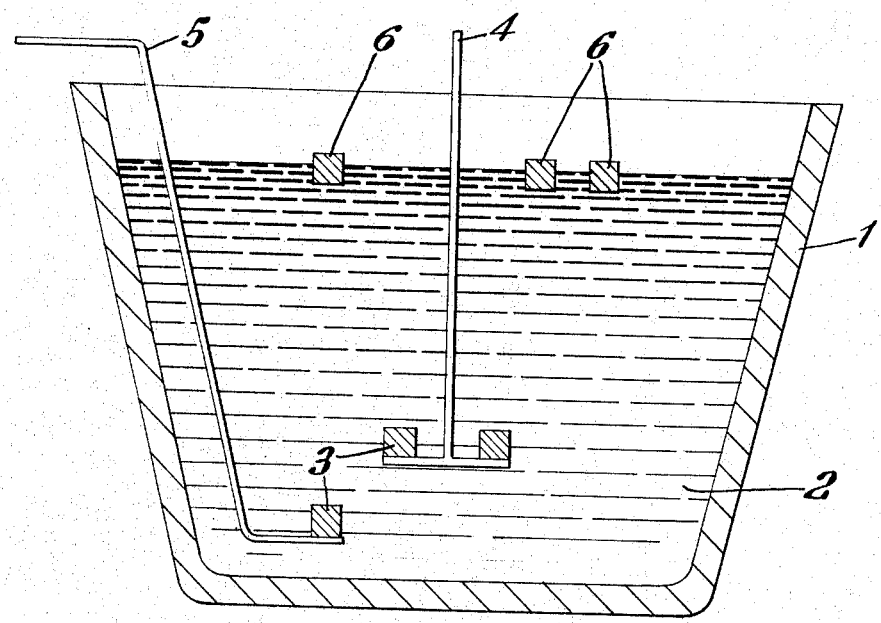
INVENTORS
EDITH M. FLANIGEN
ALLAN M. TAYLOR
Leo A. Plum, jr.
ATTORNEY United States Patent Office 3,341,302
Patented Sept. 12, 1967

3,341,302
FLUX-MELT METHOD FOR GROWING SINGLE CRYSTALS HAVING THE STRUCTURE OF BERYL
Edith M. Flanigen, Buffalo, and Allan M. Taylor, Tonawanda, N.Y., assignors to Union Carbide Corporation, a corporation of New York
Filed Oct. 6, 1964, Ser. No. 402,004
12 Claims. (Cl. 23—301)

This invention relates to a process for growing crystals having the structure of beryl. More particularly, it relates to a melt-flux process for growing large single crystals having the structure of beryl of a size and quality suitable for scientific and commercial uses.

Beryl, which is the only ore of beryllium, is a crystal having the ideal composition $3BeOAl_2O_36SiO_2$, and is commonly found in its natural form in granite pegmatites. Its crystal structure is a hexagonal system, and it is usually found in the form of long, flatly terminated six-sided prisms. The framework of the crystal structure of beryl is a complex cyclosilicate ring structure in which the silicon atoms are at the centers of a group of four oxygen atoms lying at the points of tetrahedra. These tetrahedral groups are linked together by the sharing of oxygen atoms in the rings having the composition $Si_6O_{18}$. The silica rings are joined together by aluminum atoms lying in the center of a group of six oxygen atoms, and by beryllium atoms in a similar group of four oxygen atoms. There are two molecules in each unit cell. Beryl ranges in Mohs' hardness from 7.5 to 8, and in specific gravity from 2.63 to 2.85.

In addition to pure beryl, there are crystallographic analogs of beryl which are also valuable for scientific and commercial uses. The structure of these analogs is essentially the same as that of beryl, except for the presence of small amounts of materials other than the oxides of beryllium, silicon and aluminum which are present. For example, when small amounts of aluminum are isomorphously replaced by chromium in the beryl crystal structure, a green crystallographic analog of beryl is obtained which has essentially the same crystal structure of beryl. The product thus obtained is commonly known as emerald, although green gemstone emeralds do not necessarily always contain chromium.

When a metal ion other than those of aluminum, silicon and beryllium is incorporated in small amounts in the structure of beryl, the crystal which is thus obtained is commonly known in the art as a "doped" crystal. For example, when small amounts of chromium are incorporated in the crystal structure of beryl, the resulting emerald which is obtained could be considered to be a "chromium-doped" beryl. The ion thus incorporated in the crystal structure is usually referred to as a "dopant ion." For example, in the case of synthetically grown emerald or "chromium-doped" beryl the chromium which is incorporated in the synthetic crystal would be considered to be the "dopant" ion. Thus, the terms "doped" and "dopant" are well-known in the art and are intended to have the above-defined and well-known meanings whenever they appear hereinafter in this application.

In recent years there has been an increased interest in the art of growing large synthetic crystals. Although initially this interest was stimulated by successes in growing synthetic crystals for use in the gemstone art (for example, synthetic ruby and synthetic sapphire crystals, etc.) more recent developments in the physics and chemistry of the solid state have created a demand for synthetic crystals which may also be of interest in the field of solid state applications (for example, large synthetic crystals of ruby or red corundum have been used successfully in maser and laser applications).

Although there are several general types of processes known for growing crystals (for example, the Verneuil or flame-fusion process, and the Czochralski method for crystallizing from a melt), these processes have inherent drawbacks for growing large synthetic crystals of beryl and beryl analogs. The two mentioned techniques are most often applied to growth of less complex systems and to crystals which melt congruently. The large thermal gradients which are inherent in these processes tend to induce strain, particularly in crystals of large size. A third method of growing single crystals is by the hydrothermal method, wherein an aqueous solvent under high temperatures and pressures is used to increase the solubility of reactants to a point at which crystals of a material may be prepared. One drawback of the hydrothermal method, however, is the need for expensive reaction vessels and auxiliary equipment capable of developing and maintain high pressures at high temperatures for extended periods of time. Operating difficulties sometimes encountered in high pressure, high temperature processes may also make the method less desirable.

Although the melt-flux process for crystal synthesis is known in the art as a general technique used in crystallization, the applicability of this process depends to a great extent on the particular type of crystal which is being synthesized, the process conditions which are employed, and the nature of the starting materials and flux which are used. The melt-flux process of crystallization is generally understood to mean a process wherein a solution is formed of the various components of the desired crystals as solutes, and an inorganic compound at a temperature above its melting point termed a molten flux is used as solvent, and wherein under the proper conditions the solute-components crystallize out of the flux solution to form the desired crystal. Crystallization normally is achieved by slowly cooling the entire solute-flux solution to form the desired crystal, or by maintaining a thermal gradient within the solute-flux solution. Although there are teachings available in the prior art relating to melt-flux processes for growing synthetic crystals having the structure of beryl, none of these teachings provide a satisfactory method for growing high-quality single crystals of this type of any significant size in a relatively short period of time. In order to obtain high-quality single crystals of any significant size from a melt-flux process, it is essential to minimize spontaneous nucleation which results in the formation of large quantities of microcrystals of irregular shape and size, and it is also essential to minimize the inclusion of the flux material and other impurities in the crystal being grown. Prior to the present invention it has been difficult, if not impossible, to satisfy all of the above-mentioned essential requirements and grow high-quality single crystals having the structure of beryl from a melt-flux process in a relatively short period of time due to both the basic limitations of the process involved, and the complex composition of the crystal being grown. Even when seed crystals are employed in an attempt to avoid or minimize the spontaneous nucleation from the flux-melt solution, uncontrolled saturation-growth conditions caused for example by excessive circulation due to rapid convection currents, etc., result in crystal products which contain large quantities of impurities such as inclusions of the flux and other precipitates.

In addition to the limitations inherent in the melt-flux processes of the prior art, the complex composition of the crystal being grown presents further difficulties in that crystals having the structure of beryl contain more than one oxide component in relatively well-defined ratios, and that one or more of these oxide components can form crystals or precipitates having a composition or structure different from that of beryl. Thus it is apparent that the formation of these other crystalline phases or precipitates comprising one or more of the oxide components in crystals having the structure of beryl, is to be avoided in order to obtain large single crystals having the structure of beryl which are substantially free of other crystalline phases and precipitates as impurities. The prior art processes do not provide an efficient method of eliminating excessive circulation within the flux solution and of controlling the concentration of the component oxides of the solute in said flux solution to maintain the solute oxides in a state of equilibrium with respect to the growing crystal, a method which permits the growth of high quality single crystals having the structure of beryl and minimizes or prevents the formation and inclusion of impurities such as other crystalline phases and precipitates.

The principal object of the present invention is to provide an improved melt flux process for synthesizing single crystals having the structure of beryl, particularly beryl analogs doped with transition metal or rare earth metal ions.

Another object is to provide a method of synthesizing crystals having the structure of beryl, particularly those doped with transition metal or rare earth metal ions, which are of a size and quality suitable for use in the gemstone art and in solid-state devices.

Other and further objects and advantages of the present invention and the preferred embodiments thereof will become apparent and are disclosed in detail in the following description.

The present invention relates to a melt-flux process for growing single crystals having the structure of beryl which comprises depositing a composition having the structure of beryl on a seed crystal from a molten flux solution containing nutrient sources of the oxides of beryllium, aluminum, and silicon and comprising said oxides as solutes in a state of equilibrium with respect to the crystals being grown, the flux being selected from the class consisting of vanadium pentoxide, acidic molybdate salts of alkali metals, and acidic tungstate salts of alkali metals, and the nutrient sources being located in the flux solution in a zone which is above the zone in which the seed crystal is located and which is maintained at a higher temperature than that of the zone in which the seed crystal is located.

The drawing is a cross-sectional view of apparatus suitable for the growth of beryl on a seed crystal in accordance with this invention.

Referring again to the drawing, there is shown a receptacle 1 containing molten flux material 2. Seed crystals 3 are suspended on hangers 4 and 5 and positioned in a lower zone of the molten flux-filled receptacle. Nutrient source materials 6 are positioned in an upper zone of the molten flux-filled receptacle.

The nutrient sources of the oxides of beryllium, aluminum, and silicon which may be employed in the practice of this invention are not narrowly critical, in that any of the many solid forms of these oxides, singly or combined which are convenient and readily available may be employed, including beryl itself. In addition to beryl as an oxide nutrient source, sources such as optical grade quartz crystal, fused quartz or silica, porous $SiO_2$ glass and the like, may be employed as sources for silicon dioxide, sources such as sapphire (corundum), powdered aluminum oxide ($Al_2O_3$), or aluminum oxide rod, and the like, may be employed as sources for aluminum oxide; and sources such as powdered beryllium oxide, beryllium oxide rod, and the like may be employed as sources for beryllium oxide. Combined oxide sources other than beryl, such as phenacite, chrysoberyl, mullite, and the like may also be used. Since it is essential to maintain a concentration of the various oxides in the solute-flux solution which provides a solution of these oxides in a state of equilibrium with the crystal being grown, the form of nutrient sources employed depends to a large extent on the solubility of the various nutrient oxides in the flux which is employed.

In a preferred method of practicing the present invention, the more readily soluble forms of the nutrient oxides such as powedered oxides are initially added to the flux in amounts sufficient to approximate the amount required to establish a state of equilibrium at operating temperature with the crystal being grown, and additional, less readily soluble forms of the nutrient sources are added to maintain this equilibrium and provide nutrient as the crystal grows. For example, powdered BeO, $Al_2O_3$ and $SiO_2$ (glass), may initially be added to the flux in amounts sufficient to approximate the amount required to establish the required state of equilibrium at operating temperature between the oxide solutes and the crystal being grown, and then either beryl, or the combination of beryl, sapphire, and/or beryllium oxide rod may be added to maintain this state of equilibrium and provide nutrient throughout the period of growth. The use of beryl as the additional, less readily soluble form of nutrient source is preferred.

Since it is also essential in the present invention to maintain the zone in the flux solution in which crystal growth occurs at a temperature lower than that of the zone containing any undissolved oxide nutrients, and to insure that this hotter zone containing any undissolved nutrient sources is above that in which the crystal is grown, one or more of these undissolved nutrient sources which may be present may have to be supported in the upper zone of the flux solution, depending on the relative density of the nutrient source with respect to the flux which is employed. If an undissolved nutrient source is less dense than the flux solution employed, it can merely be floated on the surface of the melt. If however, the nutrient source has a greater density than that of the flux solution, the source will have to be suspended or supported in the upper zone of the flux solution by using a retaining means such as a wire, a screen, a basket, a tray, and the like.

The fluxes which may be employed as solvents in the practice of this invention are those included in the class consisting of vanadium pentoxide, acidic molybdate salts of alkali metals, and acidic tungstate salts of alkali metals. The term "acidic" as used above is intended to define an alkali metal salt of molybdenum, or tungsten having the formula:

$$M_2O \cdot xZO_3$$

wherein M represents an alkil metal, Z represents molybdenum, or tungsten, and $x$ is greater than one.

Mixtures of the above-mentioned salts may also be employed, as well as a mixture of one or more of the above-mentioned salts with vanadium pentoxide.

Illustrative of the type of acidic salts which may be employed as fluxes in the practice of this invention are acidic molybdates of the formula $Li_2O \cdot xMoO_3$, acidic sodium molybdates of the formula $Na_2O \cdot xMoO_3$, acidic lithium tungstates of the formula $Li_2O \cdot xWO_3$, and acidic sodium tungstates of the formula $Na_2O \cdot xWO_3$ wherein $x$ in the above formulae is greater than one. The preferred fluxes of this invention are vanadium pentoxide, acidic lithium molybdates of the formula $Li_2O \cdot xMoO_3$ wherein $x$ is equal to or greater than 2.0, and acid lithium tungstates of the formula $Li_2O \cdot xWO_3$ wherein $x$ is equal to or greater than 2.0. Acidic lithium molybdates having the formula 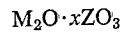$Li_2O \cdot xMoO_3$ wherein $x$ is from 2.25 to 3.25 are particularly preferred.

In addition to beryl, crystals having the structure of beryl and containing ions of a metal selected from the class consisting of transition metals and rare earth metals may also be grown in the process of this invention. When doped beryl crystals are prepared according to the present process, the source of the transition metal or rare earth metal ion dopant is a rare earth or transition metal compound such as a transition metal or rare earth hydroxide, a transition metal or rare earth metal nitrate, a transition metal or rare earth metal oxide, a transition metal or rare earth metal chloride, a transition metal or rare earth metal sulfate, an alkali salt of a transition metal oxide or rare earth metal oxide, and the like. Dopant ions such as chromium, vanadium, iron, nickel, neodymium, gadolinium, manganese ions are preferred.

Although it theoretically should be possible to incorporate over 10% by weight of a transition metal ion or a rare earth metal ion as a dopant in the beryl structure, lower weight percentages of dopant are normally incorporated into the beryl crystal by the process of this invention. Depending primarily on the requirements dictated by the particular end use of the crystal being grown, the concentration of transition metal or rare earth metal ion dopant in the crystal product may vary from about 0.005 weight percent to about 8 weight percent, based on the total weight of the crystal; a range of from about 0.01 weight percent to about 2 weight percent is preferred. When the dopant ion is chromium, a range of from about 0.1 to about 2 weight percent is particularly preferred.

In order to provide an amount of transition metal ion or rare earth metal ion sufficient to produce crystals containing dopants in amounts within the ranges of percentages set forth above, the solute-flux solution should contain a metal ion concentration of from about 0.001 weight percent to about 5 weight percent. Preferably, the concentration of transition metal ion or rare earth metal ion in the solute-flux solution is from about 0.01 weight percent to about 2 weight percent. More than one transition metal or rare earth metal ion may be used simultaneously as a dopant.

In practicing the process of this invention the synthetic beryl or doped beryl is grown on one or more seed crystals positioned in the lower portion of the solute-flux solution which is kept at a lower temperature than that of the upper portion of said solution. Under equilibrium conditions, the oxide solutes crystallize out of the solute-flux solution onto the surface of the seed in the proper ratio (along with dopant ions, if a dopant is employed) to form new crystal growth thereon. Continuing dissolution of the solid nutrient sources in the upper, hotter zone replenishes the oxides removed from the solute-flux solution through diffusion of the newly dissolved oxide solutes through the flux and deposition on the growing crystal. In this manner the state of equilibrium between the oxide solutes and the solid crystal being grown is constantly maintained, and continuous growth of new crystal on a seed or seeds can be controlled and sustained for an extended period of time.

Although any crystal having the structure of beryl or other suitable substrate may be used as a seed, a seed crystal of natural or synthetic beryl or a beryl analog such as aquamarine or emerald is usually employed. Normally, if a natural seed crystal is used, growth is conducted on the seed crystal until the new growth is thick enough to be cut from the original seed. This new growth may then be employed as a seed crystal in subsequent growth runs. In this way macro-crystals of beryl structure of only synthetic origin may be obtained, and this method proves to be particularly useful in preparing massive crystals of beryl structure having a high degree of purity and uniform composition and structure.

The preferred seed materials for use in initiating the growth of synthetic crystals are those having the highest degree of crystal perfection, and minimum amount of water, e.g., high quality natural beryl, aquamarine or emerald which has been heat-treated prior to use as seed crystal, or synthetic beryl or emerald crystals. Although the surface condition and orientation of the seed crystal which is employed in the practice of this invention is not narrowly critical, we have found that both the surface condition and orientation of the seed may affect the rate of growth. The use of seed plates wherein the faces of said plates are oriented perpendicular to the $c$-axis of the crystal are preferred.

As hereinbefore indicated, it is also essential to practicing the process of this invention to position the seed crystals in the lower portion of the flux solution, and to maintain this portion of the flux solution at a temperature lower than that of the upper portion of the same solution. Thus, under the operating conditions required in the present process, a thermal gradient which is the reverse of that normally encountered must be maintained. Although prior to this invention it was generally considered necessary to have a certain amount of convection in a melt-flux system in order to effect transport of the oxide solutes within the flux solution, the applicants have discovered that convection within the system can be one of the primary causes of instability within the flux solution and inclusions of flux material and other precipitates in the crystals being grown; and that controlled growth on a seed or seeds can be maintained in the absence of convection by the mere diffusion of the oxide solutes through the flux solution to the region where crystallization occurs. Thus, convection in a melt-flux system is not only unnecessary, but may also be highly undesirable, particularly in a system where crystals of complex composition are being grown; and the oxide solutes can be transported through the flux solution by diffusion alone in amounts sufficient to achieve high quality crystal growth at an appreciable rate. The applicants have found that convection can be avoided, thereby eliminating the deleterious convection effects on the crystals being grown, by creating a reverse thermal gradient in a relatively quiescent flux solution, as hereinbefore described. Since the upper portion of the flux solution is constantly maintained at a higher temperature ($T_t$) than that of the lower portion ($T_b$), and is therefore less dense with respect to said lower portion, convection currents within the system are virtually eliminated through the use of this reverse thermal gradient technique. Although the temperatures at which the process of this invention is conducted are highly dependent on the flux employed and the solubility of the oxide components in a given flux, the temperature gradient should range from between about 1° C./cm. and about 20° C./cm. Smaller gradients result in slower rates of growth, and larger gradients may make crystallization difficult to control (e.g., a larger gradient may cause spontaneous nucleation, etc.). A gradient of from about 2° C./cm. to about 10° C./cm. is prefered. It should be recognized that within the range of operable temperature gradients set forth above, the profile of temperature gradient may vary somewhat throughout the flux solution, due to the specific apparatus geometry employed and the heat-transfer limitations presented by the solute-flux solution (i.e., the temperature gradient within the upper zone of the system may be slightly higher than that of the lower zone). It should also be appreciated that there is no sharp demarcation between the upper and lower regions or zones, since the temperature gradient which is maintained between these zones causes a relatively gradual temperature difference between adjacent portions of the solution as the temperature decreases from the surface of the melt-flux solution to the lowest portion of said solution. In a preferred form of this invention the temperature gradient within the zone of crystal growth is reduced as much as possible to minimize the opportunity for spontaneous nucleation within said zone of growth. Under ideal conditions, the temperature within the region of the seed should be constant.

As indicated above, the overall operating temperatures at which the process of this invention may be conducted may vary, depending on the flux which is employed and the solubility of the oxide components in a given flux. The use of the lower temperatures within the operable range for any given flux result in slower rates of crystal growth, and the use of temperatures in excess of the upper limits of the operable range for any given flux result in excessive volatilization of the flux material and decomposition of the growing crystal. The operable temperature range for the fluxes which may be employed in this invention is broadly defined by the melting point of the flux and up to about 1300° C. with the acidic lithium molybdate flux the preferred range is of from about 700° C. to about 1000° C. With the acidic lithium tungstate flux the preferred range is from about 900° C. to about 1200° C. With the vanadium pentoxide flux, the preferred range is from about 900° C. to 1200° C. If temperatures in excess of the upper limits of the preferred ranges set forth above are to be employed, the reaction vessel should be sealed.

The apparatus which may be employed in conducting the process of this invention is not narrowly critical, since this process can be conducted in any vessel which is unreactive within the range of operating temperatures with the flux, the solutes and any dopant materials which may be present in the melt flux solution.

The use of containers made of high melting point noble metals such as platinum is preferred. The size of the container employed in the reaction is not critical. If an increase in container size and solution volume is desired as for example in a scaled-up process, it is preferred to increase the diameter of the container, maintaining the height fairly constant in order to minimize container cost and accommodate the maximum number of seeds in the growth zone.

A convenient form of apparatus for conducting the process of this invention is a platinum crucible having a depth of approximately 7 cm. and a diameter at its base which is approximately the same as the lip diameter. The required temperature gradient may be achieved by the use of any common heating means for example, a vertical tube furnace with more than one resistance heating element (a so-called multiple-zone furnace) or by suitable positioning of the container and insulation of portions of the container in a single-resistance heating element tube furnace.

The following general procedure is representative of the method of the invention:

A flux of suitable composition such as $$Li_2O \cdot 2.25\text{--}3.25 MoO_3$$

is contained in a platinum crucible, which is positioned in the lower section of a vertical tube furnace. The central portion of this furnace is heated to about 1000° C. The crucible is thus subjected to a reverse thermal gradient, the hottest part of the melt being at the surface. Chips of beryl or powdered oxide nutrient are first added to the melt to adjust the solute-flux composition to an equilibrium state with respect to the growing crystal at the temperature of operation. Then one or more seed plates of natural or synthetic beryl are positioned in the cooler, lower portion of the crucible. A "test seed" of known weight may be used to aid in adjustment of flux composition and to detect the achievement of equilibrium growth conditions. By frequently removing and weighing a test seed, the point at which solution (i.e., evidence of an undersaturated melt) stops and emerald crystallizes (saturated melt) thereon begins serves to indicate that the seed plates of emerald may be lowered into the melt. A test seed plate may also be kept immersed in the melt and periodically removed for examination and measurement as an indication of the growth rate of the main seeds in that melt.

When emerald crystals of the desired size have formed the crucible is removed from the furnace. The emerald crystals are now recovered from the crucible by pouring off most of the flux and dissolving the remainder by treatments with boiling alkali solution.

A preferred embodiment of the method of invention is as follows: A platinum crucible having a depth of at least 7 cm., and preferably with the base diameter equal to the lip diameter, is used.

Ingredients:
Flux composition _____ $Li_2O \cdot 2.5MoO_3$
$Cr_2O_3$ powder
                              percent of flux weight__ 0.07 to 0.15
BeO powder _____do____ 0.95
$Al_2O_3$ powder _____do____ 2.00
$SiO_2$ glass powder _____do____ 0.27

A flux mixture is made by mixing the required proportions of the anhydrous powders $Li_2MoO_4$ and $MoO_3$. The crucible is weighed and then the flux mixture is melted down into it. The flux is cooled to room temperature and the amount present determined.

The required amounts of $Cr_2O_3$, BeO, $Al_2O_3$ and $SiO_2$ powders, as indicated above, are added to the crucible which is then placed into position below the center spot of a vertical tube furnace. The position of the crucible must be such as to give a bottom melt temperature between 820° C. and 840° C. with a minimum temperature gradient at the bottom (<5°/cm. over the lower 2 cm.) but increasing upward toward the melt surface to about 10° C./cm. The melt surface temperature should be less than 900° C. When the flux is molten the floating powders are stirred in with a platinum rod stirrer.

A test seed of heat-treated beryl of known weight (~5 g.) together with a piece of sapphire (~5 g.) are sunk to the crucible bottom. The solution of the sapphire provides a gradual approach to the alumina concentration required for crystallization of emerald. A second smaller piece of heat-treated beryl (~3 g.) is floated on the melt surface, to act as nutrient. After about 24 hours at the correct operating temperature, the test seed will be found to have a thin coating of emerald, showing that the flux is ready for the seed plates.

The seed plates used are of emerald (usually grown from flux) sliced perpendicular to the c-axis. Thickness is not more than about 1 mm., with an area between about 0.5 to 2 cm.² A circular seed frame of platinum wire may be used for mounting the seeds thereon.

When the flux is ready, the seed plate frame and a test seed are lowered into position on the crucible bottom. The flux is now ready for the nutrient beryl, which may consist of three or more pieces of heat-treated beryl weighing from 2 to 10 grams each. When the necessary amount of nutrient has been added to the flux, the crucible lid is put in place.

Initially the emerald growth rate will be between 0.1 to 0.2 mm./day and this can be checked about once a week by lifting out the test seed. The floating pieces of beryl nutrient may also be removed, cleaned of flux and weighed to ascertain their rate of solution. If the growth rate of the test seed should drop below 0.1 mm./day, additional amounts of nutrient may be added in order to increase the amount of solute. It is convenient to examine the test seed and nutrient about once a week and adjust the weight of nutrient so as to keep the growth rate of the test seed above 0.1 mm./day but not in excess of 0.2 mm./day.

When emerald crystals of the desired thickness (5 to 10 mm.) have been grown, the nutrient beryl is removed and the furnace temperature lowered slowly to near the melting point of the flux (~550° C.). The crucible is then lifted out of the furnace and most of the flux poured off. The crucible containing the crystals is quickly returned to the furnace (~500°) and slowly cooled to room temperature. The crucible is then filled with dilute NaOH solution. Repeated boiling with fresh alkali will dissolve away all the flux and the emerald crystals on the frame may then be extracted from the crucible.

Illustrative of the method of the invention are the specific examples given in Table A herewith, wherein the procedures employed followed those described in the foregoing embodiment.

TABLE A.—PRODUCTION OF CRYSTALS HAVING STRUCTURE OF BERYL FROM FLUX-MELTS

| Run No. | Init. Flux Comp. | Grad., degree/cm. | $\Delta T$, C.° [a] | Run Duration, Days [b] | Total Prod. Wt., g. | Max. Growth Rate, mm./day | Comments |
|---|---|---|---|---|---|---|---|
| 1 | $Li_2O \cdot 2.5\ MoO_3$, 788 g; $Cr_2O_3$, 0.435 g | 4–9 | 40–47 | 16.5 | 1.04 | 0.26 | Emerald product. 4 synthetic and 2 natural emerald seeds stationary and vertical on bottom; beryl nutrient two-zone furnace. |
| 2 | $Li_2O \cdot 2.5\ MoO_3$, 807 g; $Cr_2O_3$, 0.444 g | (c) | 55 | 8.4 | 0.422 | 0.14 | Emerald product. 4 synthetic emerald seeds, stationary; beryl neutrient. |
| 3 | $Li_2O \cdot 2.5\ MoO_3$, 801 g.; $Cr_2O_3$, 0.440 g | ~10 | 50–60 | 40 | 10.5 | 0.15 | Emerald product. 7 synthetic emerald seeds; beryl nutrient; large furnace. |
| 4 | $Li_2O \cdot 2.5\ MoO_3$, 312 g.; $Cr_2O_3$, 0.172 g | (c) | 55 | 40 | 6.37 | 0.13 | Emerald product. One natural and 3 synthetic emerald seeds; beryl nutrient; small furnace. |
| 5 | $V_2O_5$, 225 g.; $Cr_2O_3$, 0.112 g | ~13 | 65 | 7.2 | 0.317 | 0.16 | Emerald product. 3 synthetic emerald seeds stationary; beryl nutrient. |
| 6 | $Li_2O \cdot 2.5\ WO_3$, 1068 g.; $Cr_2O_3$, 2.975 g | ~20 | ~100 | 7.7 | 3.74 | ~0.3 | Emerald product. 2 natural beryl seeds and one synthetic emerald seed, stationary; beryl nutrient. |

[a] $T\Delta = T_T - T_B$, measured during run after the seed plates were inserted.
[b] After insertion of seed plates.
[c] No gradient measurements taken.

A crystal selected from the products of run 4 was finished into an attractive lens-cut stone of 1.13 carats. This finished gem was characterized by a pale bluish-green color, freedom of any major inclusions of flux and a high degree of brilliance. Analysis showed that the chromium content was less than 0.2 wt.-percent.

Chemical analysis of a sample of a crystal produced in run 2 indicated the following composition, expressed in weight-percentages:

$SiO_2$ ---------------------------------- 65.7±0.5
$Al_2O_3$ --------------------------------- 18.4±0.3
BeO ------------------------------------ 14.9±0.5
Cr -------------------------------------- 0.18±0.03
$H_2O$ (LOI) ----------------------------- 0.3
$Li_2O$ ---------------------------------- 0.05±0.02
$MoO_3$ ---------------------------------- 0.46±0.03

One favorable aspect of this invention is the ability to substantially confine growth of crystal having the structure of beryl to the seed, and to obtain single crystal growth on said seed or seeds which is substantially flawless and optically transparent. Spontaneous nucleation and twinning on the surface of the seed is minimized. Another favorable aspect of this invention is the ability to achieve and maintain favorable growth rates over extended periods of time.

A particular advantage of the single crystals of beryl structure produced according to this invention is the utility of the doped crystals in solid-state applications. Such applications often require that the crystal be free of crystal imperfections and contain only a controlled amount of dopant ion or ions homogeneously distributed throughout the crystal structure and be substantially free of undesirable extraneous impurities. Naturally-occurring crystals of beryl structure such as emeralds almost always contain at least small amounts of several impurity ions. In addition, the level of extraneous ions is often considerably out of the range desired for solid-state applications.

Chromium-doped beryl crystals of this invention are of a size and quality ideally suited for use in solid-state devices such as lasers and masers. F. E. Goodwin [Journal Applied Physics, 32, 1624–1625 (1961)] reported the successful operation of synthetic emeralds in a single-cavity reflection-type maser amplifier operating at 10 kMc. Goodwin noted that his synthetic emeralds "exhibited a number of imperfections, as was evidenced by microscopic twinning and spontaneous nuclei." He speculated that crystals "relatively free of polycrystalline effects . . . will exhibit narrow line widths and superior maser characteristics." The high degree of single-crystal character and other crystal perfection of the Cr-doped beryl crystals produced according to this invention are capable of providing such desired superior maser characteristics.

Though specific embodiments have been shown and described, it is to be understood that they are illustrative only, and are not to be construed as limiting the scope and spirit of this invention.

What is claimed is:

1. A melt-flux process for growing single crystals having the structure of beryl which comprises depositing a composition having the structure of beryl on a seed crystal from a molten flux solution containing nutrient sources of the oxides of beryllium, aluminum and silicon and comprising said oxides as solutes in a state of equilibrium with the crystal being grown, the flux being selected from the class consisting a vanadium pentoxide, acidic molybdate salts of alkali metals, and acidic tungstate salts of alkali metals, positioning the nutrient source and seed crystal in the molten flux solution, the nutrient sources being located in the flux solution in a zone which is above the zone in which the seed crystal is located the nutrient source being maintained at a higher temperature than that of the zone in which said seed crystal is located, the said arrangement substantially precluding impurities from migrating from said nutrient source to said seed crystal.

2. A melt-flux process for growing single crystals having the structure of beryl which comprises depositing a composition having the structure of beryl on a seed crystal from a molten flux solution containing nutrient sources of the oxides of beryllium, aluminum, and silicon, and comprising said oxides as solutes in a state of equilibrium with the crystal being grown, the flux being selected from the class consisting of vanadium pentoxide, acidic lithium molybdates of the formula $Li_2O \cdot xMoO_3$ wherein $x$ is equal to or greater than two, and acidic lithium tungstates of the formula $Li_2O \cdot xWoO_3$ wherein $x$ is equal to or greater than two, positioning the nutrient source and seed crystals in the molten flux solution the nutrient sources being located in the flux solution in a zone which is above the zone in which the seed crystal is located the nutrient source being maintained at a higher temperature than that of the zone in which said seed crystal is located, the said arrangement substantially precluding impurities from migrating from said nutrient source to said seed crystal.

3. A melt-flux process for growing single crystals having the structure of beryl and containing a minor amount of ions of a metal selected from the class consisting of transition metals and rare earth metals as a dopant which comprises depositing a composition having the structure of beryl and containing ions of the metals hereinbefore defined on a seed crystal from a molten flux solution containing nutrient sources of the oxides of beryllium, aluminum and silicon and the desired metal ions and comprising said oxides as solutes in a state of equilibrium with the crystal being grown, the flux being selected from the class consisting of vanadium pentoxide, acidic lithium molybdates of the formula $Li_2O \cdot xMoO_3$ wherein $x$ is equal to or greater than two, and acidic lithium tungstates of the formula $Li_2O \cdot xWoO_3$ wherein $x$ is equal to or greater than two, positioning the nutrient source and seed crystal in the molten flux solution, the nutrient sources being located in the flux solution in a zone which is above the zone in which the seed crystal is located the nutrient source being maintained at a higher temperature than that of the zone in which said seed crystal is located, the said arrangement substantially precluding impurities from migrating from said nutrient source to said seed crystal.

4. The process claimed in claim 1 wherein the nutrient sources initially added to the flux solution are in the form of powdered oxides of beryllium, aluminum and silicon and are added in amounts sufficient to establish a state of equilibrium at operating temperature with the crystal being grown, and an additional nutrient source in the form of materials selected from the class consisting of beryl and beryl analogues is positioned in the upper zone of the flux solution to maintain the state of equilibrium and provide nutrient throughout the period of crystal growth.

5. The process claimed in claim 4 wherein the flux is an acidic lithium molybdate having the formula $$Li_2O \cdot xMoO_3$$

wherein $x$ is from 2.25 to 3.25.

6. The process claimed in claim 1 wherein a vertical reverse thermal gradient of from about 2° C./cm. of solution to about 10° C./cm. of solution is maintained and the process is operated in a temperature range of from about 700° C. to about 1000°C.

7. The process claimed in claim 3 wherein the metal ion is selected from the class consisting of chromium, vanadium, iron, nickel, neodymium, gadolinium and manganese.

8. The process claimed in claim 7 wherein the metal ion concentration in the flux solution is from about 0.001 weight percent to about 5 weight percent.

9. A melt-flux process for growing single crystals of synthetic emerald which comprises depositing synthetic emerald on a seed crystal from a molten flux solution containing chromium ions and nutrient sources of the oxides of beryllium, aluminum and silicon and comprising said oxides as solutes in a state of equilibrium with the crystal being grown, the flux being selected from the class consisting of vanadium pentoxide, acidic molybdate salts of alkali metals, and acidic tungstate salts of alkali metals, positioning the nutrient source and seed crystal in the molten flux solution, the nutrient sources being located in the flux solution in a zone which is above the zone in which the seed crystal is located the nutrient source being maintained at a higher temperature than that of the zone in which said seed crystal is located, said arrangement substantially precluding impurities from migrating from said nutrient source to said seed crystal.

10. The process claimed in claim 9 wherein the flux is selected from the class consisting of vanadium pentoxide, acidic lithium molybdates of the formula $Li_2O \cdot xMoO_3$ wherein $x$ is equal to or greater than two, and acidic lithium tungstates of the formula $Li_2O \cdot xWoO_3$ wherein $x$ is equal to or greater than two.

11. The process claimed in claim 10 wherein the flux is an acidic lithium molybdate having the formula $$Li_2O \cdot xMoO_3$$

wherein $x$ is from 2.25 to 3.25.

12. The process claimed in claim 9 wherein from about 0.01 weight percent to about 2 weight percent of chromium ions are present in the flux solution.

References Cited
UNITED STATES PATENTS

| | | | |
|---|---|---|---|
| 2,942,941 | 6/1960 | Merker | 23—273 |
| 3,224,840 | 12/1965 | Lefever | 23—301 |
| 3,234,135 | 2/1966 | Ballan | 23—301 |

OTHER REFERENCES

Lawson et al.: "Preparation of Single Crystals," Butterworth Scientific Publications 1959, p. 29.

NORMAN YUDKOFF, *Primary Examiner.*

G. P. HINES, *Assistant Examiner.*